3,173,800
REDUCING THE CAKING OF SULFONATED ASPHALT

Joseph F. Wilson, Bartlesville, Okla., assignor to Phillips Petroleum Company, a corporation of Delaware
No Drawing. Filed May 4, 1962, Ser. No. 192,348
11 Claims. (Cl. 106—274)

This invention relates to a method of treating sulfonated asphalt to reduce its normal tendency to cake on standing, and to the treated product so obtained.

It has been recently discovered that sulfonated asphalt is particularly useful as an additive in well-working fluids. The use of sulfonated asphalt in drilling fluids is disclosed and claimed in application Serial No. 726,047, filed April 3, 1958, now U.S. Patent No. 3,028,333, by Charles A. Stratton et al., and the use of sulfonated asphalt in fracturing fluids is disclosed and claimed in copending application Serial No. 859,158, filed December 14, 1959, now U.S. Patent No. 3,070,165, by Charles A. Stratton. The sulfonated asphalt is produced, broadly, by sulfonating asphalt with a sulfonating agent, such as fuming sulfuric acid, and neutralizing the resulting sulfonic acids to convert the same to water and oil dispersable ammonium, alkali metal, or alkaline earth metal salts of sulfonated asphalt. A preferred way of preparing these sulfonated asphalts is disclosed in copending application Serial No. 859,117, filed December 14, 1959, by Charles A. Stratton, now U.S. Patent No. 3,089,842, the method disclosed and claimed therein comprising dispersing asphaltic material in a normally liquid, inert, paraffinic hydrocarbon and contacting the same with liquid sulfur trioxide, and then neutralizing the resulting sulfonic acids to produce the corresponding ammonium, alkali metal, or alkaline earth metal petroleum sulfonates.

The sulfonated asphalt prepared as described above has in its particulate form a normal tendency to cake on standing, particularly when the water content of the sulfonated asphalt product exceeds 5 to 7 weight percent. Under normal manufacturing operations, the sulfonated asphalt is produced with less than this water content. However, it can increase to 8 or 10 weight percent, and even as high as 17 weight percent, for example when production is increased and the drying step is overloaded. When the sulfonated asphalt product contains these increased amounts of water and the product is stored in stacked bags over any substantial length of time, the product often sets up to a hard mass because of caking. This caking tendency often makes it difficult to handle the sulfonated asphalt. For example, when sulfonated asphalt is used to reduce the fluid loss of drilling fluids, it tends to plug or bridge hoppers, etc., due to its caked nature. When the sulfonated asphalt is appreciably caked, it makes it difficult to proportion the product and obtain uniform dispersions in liquids, such as drilling fluids or fracturing fluids.

Accordingly, it is an object of this invention to reduce the normal tendency of sulfonated asphalt to cake on standing. Another object is to provide a method of treating sulfonated asphalt to reduce its tendency to cake and to maintain it in a relatively free-flowing condition. Another object is to provide an improved particulate sulfonated asphalt product which can be readily handled, proportioned, dispersed, etc. These and other objects of this invention will become apparent to those skilled in the art from the following description and appended claims.

Broadly, I have discovered that the normal tendency of particulate sulfonated asphalt to cake on standing can be reduced or prevented by admixing sulfonated asphalt with an anti-caking agent comprising a particulate material selected from the group consisting of anhydrous trisodium phosphate, sodium phosphate glasses having a ratio of $Na_2O/P_2O_5$ of about 0.5 to 1.0, calcium chloride, and silicas or aluminas having a particle size of about 0.01 to 0.1 micron. The particular anti-caking agent used will be dependent upon its cost, the degree of anti-caking it imparts to the sulfonated asphalt, the ultimate use of the treated sulfonated asphalt, and other factors which will be appreciated by those skilled in the art. For example, where the treated sulfonated asphalt is to be used in those drilling fluids which cannot tolerate further amounts of calcium, an anti-caking agent other than calcium chloride can be used, e.g., silica.

The term "sulfonated asphalt" as used in this specification and in the appended claims is employed herein to mean the ammonium, alkali metal, and alkaline earth metal salts of asphalt that has been sulfonated with a sulfonating agent, such as oleum, and neutralized with ammonia an alkali metal oxide or hydroxide, or an alkaline earth metal oxide or hydroxide. The term "asphalt" is employed here in the same context as used in said copending applications, namely the dark brown to black semi-solid or solid cementitious hydrocarbon material occurring in nature as such or of pyrogeneous origin, or a combination of both, or fractions and components thereof, which are completely or substantially soluble in carbon disulfide, and wherein bitumen is the sole or predominant constituent.

Sulfonated asphalt is made commercially in the form of its particulate (or flaky) sodium salt and it is sold under the trademark "Soltex."

The normal tendency of the sulfonated asphalt to cake on standing can be reduced according to this invention by admixing it in any suitable manner with one or more of said anti-caking agents. For example, the anti-caking agent can be dry-blended with the sulfonated asphalt in a suitable mixer such as a Banbury mixer, a Sigma blade mixer, or the like. The anti-caking agent can be added during production of the sulfonated asphalt, for example by adding it to the neutralizing sulfonic acid-diluent dispersion, or it can be admixed with the particulate sulfonated asphalt at any time prior to bagging and storing the product. The terms "admixture" or "admixed" as used herein, are meant to cover any of these techniques of contacting the sulfonated asphalt with the anti-caking agent, unless otherwise indicated.

The amount of anti-caking agent used in this invention will vary, but generally will be in the range from 0.5 to 10 weight percent of the sulfonated asphalt, and usually from 1 to 7 weight percent of the sulfonated asphalt will be adequate for most cases. Larger amounts of the anti-caking agent can be used, but such amounts will be dictated by the use of the sulfonated asphalt. For example, where the latter is used as a drilling fluid additive, the amount of anti-caking agent used must be such that it does not adversely affect the rheology of the drilling fluid or its desirable low fluid loss properties. And, the amount of anti-caking agent used will depend somewhat upon the degree of anti-caking effect desired, the particular anti-caking agent used, and the water content of the sulfonated asphalt. Stated functionally, the amount of anti-caking agent admixed with the sulfonated asphalt will be that amount sufficient to reduce the tendency of the latter to cake on standing. Though I prefer to use the anti-caking agent only where the water content of the sulfonated asphalt is such that the sulfonated asphalt would normally tend to cake on standing, for example where the water content is greater than 5 weight percent, I also can use it where the water content of the sulfonated product is lower than this since on standing or through use its water content may increase and otherwise give rise to caking.

The objects and advantages of this invention are further illustrated by the following examples, but it should be understood that this invention is not to be limited unduly to these examples since the same are set forth merely for the purposes of illustration.

A series of runs were carried out in which sulfonated asphalt was blended with various finely divided inorganic materials, after which the mixture was evaluated for development of caking tendency.

The sulfonated asphalt used in these runs was a commercial drilling mud additive sold under the trademark "Soltex" and was prepared by the sulfonation of an asphalt of a West Texas crude. The sulfonation was carried out using liquid $SO_3$ as the sulfonating agent, and following sulfonation, the mixture was neutralized with aqueous NaOH, dried and flaked. The sulfonated asphalt sample used in the runs contained 11.0 wt. percent water.

In carrying out these runs, the desired amounts of particulate sulfonated asphalt and particulate material were weighed out, and the two materials were then blended together at room temperature. In each run, 40 grams of the sulfonated asphalt and the desired amount of inorganic chemical to be evaluated were blended in a 12 oz. beverage bottle, which was then sealed tightly with a rubber stopper. The stoppered bottle was then placed in an oven maintained at 140° F. for 2 hours. The hot bottle was then removed from the oven and shaken for 2 minutes, after which the bottle was allowed to cool to room temperature. The bottle was then opened, and the contents were charged to the polyethylene sleeve described below in the "cake test." The described cake test was used for determining the caking tendency of the mixture.

The mixture from each bottle was poured into polyethylene cylinders fabricated from two layers of 1½-mil wall thickness polyethylene. The inside diameter of the cylinders was 1⅞ inches, and the ends of the cylinders were plugged with Lucite blocks ½-inch thick and 1⅛ inches in diameter. The blocks were held in the cylinders by means of cellophane tape. The loaded cylinders were then placed in a brass mold containing 3 holes, each 4 inches deep and 2 inches in diameter. Weights, each weighing 5 lbs., 5 oz. were placed on top of each cylinder, and the entire arrangement was placed in an oven maintained at 140° F. for 18 hours. The mold was then removed from the oven, and one side of the mold was opened. The cakes which had formed by this procedure were tested to breaking or crushing in a Carver press, and the pressure in p.s.i. required to break each cake was calculated and recorded. The results of these runs are expressed below as Table I. Where the procedure resulted in sulfonated asphalt samples which did not cake but rather were free-flowing, these samples were designated "FF." And where the procedure resulted in cakes which collapsed upon subjection to initial pressure (i.e., less than 10 p.s.i.) in the Carver press before a pressure reading could be noted, such samples were designated as "LB" to denote light bridging and collapse of the lightly bridged cakes to free-flowing particles.

*Table I*

| Run | Inorganic material used | Amt. of inorganic material, wt. percent of sulfonated asphalt | Crushing strength of sulfonated asphalt, p.s.i. |
|---|---|---|---|
| 1 | None [a] | 0 | 200 |
| 2 [b] | Anhydrous trisodium phosphate | 1 | 40 |
| 3 | ----do---- | 3 | 30 |
| 4 | ----do---- | 5 | 20 |
| 5 | ----do---- | 8 | 30 |
| 6 | Calcium chloride | 1 | 80 |
| 7 | ----do---- | 2 | 90 |
| 8 | ----do---- | 3 | FF |
| 9 | ----do---- | 5 | FF |
| 10 | ----do---- | 7 | FF |
| 11 | ----do---- | 10 | FF |
| 12 | Sodium hexametaphosphate [c] | 3 | 30 |
| 13 | ----do---- | 6 | LB |
| 14 | Sodium hexametaphosphate [d] | 3 | 50 |
| 15 | ----do---- | 5 | 60 |
| 16 | Sodium phosphate glass [e] | 3 | LB |
| 17 | ----do---- | 6 | LB |
| 18 | Silica [f] (0.015-0.02 micron) | 1 | 90 |
| 19 | ----do---- | 2 | 80 |
| 20 | ----do---- | 3 | FF |
| 21 | Alumina (0.01-0.04 micron) | 1 | 110 |
| 22 | ----do---- | 2 | 110 |
| 23 | ----do---- | 3 | FF |
| 24 | Tetrasodium pyrophosphate | 1 | 230 |
| 25 | ----do---- | 3 | 180 |
| 26 | Silica [g] (2-4 micron) | 3 | 240 |
| 27 | ----do---- | 6 | 140 |
| 28 | Diatomaceous earth | 3 | 220 |
| 29 | ----do---- | 6 | 150 |
| 30 | ----do---- | 3 | 160 |
| 31 | ----do---- | 5 | 130 |
| 32 | ----do---- | 7 | 30 |
| 33 | Attapulgite | 3 | 275 |
| 34 | Kaolin | 3 | 250 |
| 35 | Calcium hydroxide | 6 | 150 |
| 36 | Calcium oxide | 7 | 90 |
| 37 | Oyster shell ($CaCO_3$) | 6 | 240 |
| 38 | Anhydrous sodium carbonate | 8 | 100 |
| 39 | Anhydrous calcium sulfate | 10 | 1,000 |
| 40 | Anhydrous magnesium sulfate | 3 | 150 |
| 41 | ----do---- | 8 | 30 |
| 42 | Anhydrous sodium sulfate | 7 | 130 |
| 43 | Graphite | 6 | 230 |
| 44 | Calcium petroleum sulfonate | 6 | 350 |
| 45 | Lignite | 10 | 240 |

[a] Sulfonated asphalt with a water content of 6.5 wt. percent was found to have a crushing strength of 35 p.s.i.
[b] Sulfonated asphalt and inorganic material was mixed and allowed to stand 24 hrs. before evaluating sample by cake test.
[c] $Na_2O/P_2O_5 = 1$.
[d] $Na_2O/P_2O_5 = 1$ ("Calgon").
[e] $Na_2O/P_2O_5 = 0.5$ ("Hi-Phos").
[f] "Cab-O-Sil".
[g] "Sil-Flo".

The data of Table I show that the anti-caking agents of this invention (Runs 2–23) are indeed effective in reducing or preventing the caking of sulfonated asphalt and that relatively small amounts of the anti-caking agents will give the necessary storage stability. The other data show that many other inorganic materials do not significantly reduce caking of the sulfonated asphalt, while others reduce caking only when used in substantial amounts.

Various modifications and alterations of this invention will become apparent to those skilled in the art without departing from the scope and spirit of this invention, and it should be understood that this invention is not to be limited unduly to that set forth herein for illustrative purposes.

I claim:

1. A method for reducing the tendency of sulfonated asphalt to cake when it is in its particulate form, which comprises admixing said sulfonated asphalt in its particulate form with a material selected from the group consisting of anhydrous trisodium phosphate, sodium phosphate glasses having a ratio of $Na_2O/P_2O_5$ of about 0.5 to 1, calcium chloride, and silicas and aluminas having a particle size of about 0.01 to 0.1 micron, said material being employed in an amount sufficient to reduce the tendency of said sulfonated asphalt to cake.

2. The method according to claim 1, wherein said material is admixed with said sulfonated asphalt by tumbling the sulfonated asphalt in particulate form with said material in dry particulate form so as to coat said particulate sulfonated asphalt with said material, the amount of said material coated on said sulfonated asphalt being sufficient to reduce the caking of said sulfonated asphalt.

3. The method according to claim 1 wherein the amount of said material is in the range of 0.5 to 10 weight percent.

4. The method according to claim 1 wherein the amount of said material is in the range of 1 to 7 weight percent.

5. The method according to claim 1 wherein said material is calcium chloride.

6. The method according to claim 1 wherein said material is silica.

7. The method according to claim 1 wherein said sulfonated asphalt is selected from the group consisting of the ammonium, alkali metal, and alkaline earth metal salts of sulfonated asphalt.

8. The method according to claim 1 wherein said sulfonated asphalt is in the form of its sodium salt.

9. As a new composition of matter, particulate sulfonated asphalt coated with a material selected from the group consisting of anhydrous trisodium phosphate, sodium phosphate glasses having a ratio of $Na_2O/P_2O_5$ of about 0.5 to 1, calcium chloride, and silicas and aluminas having a particle size of about 0.01 to 0.1 micron, said material being employed in an amount sufficient to reduce the tendency of said sulfonated asphalt to cake.

10. A composition of matter according to claim 9 wherein said sulfonated asphalt is selected from the group consisting of the ammonium, alkali metal, and alkaline earth metal salts of sulfonated asphalt, and said material is employed in an amount of 0.5 to 10 weight percent of said sulfonated asphalt.

11. A composition of matter according to claim 10 wherein said sulfonated asphalt is in the form of its sodium salt.

References Cited in the file of this patent

UNITED STATES PATENTS

| | | |
|---|---|---|
| 2,423,144 | Gregg | July 1, 1947 |
| 3,028,333 | Stratton et al. | Apr. 3, 1962 |

OTHER REFERENCES

The Condensed Chemical Dictionary, Sixth Edition, Reinhold Publishing Corporation, New York, 1961 (p. 982 relied upon).